R. G. PETERSON & J. COULTER.

Improvement in Nut-Locks.

No. 127,509.

Patented June 4, 1872.

Witnesses:
A Bennerendorf.
W. A. Graham

Inventor:
R. G. Peterson
J. Coulter
Per
Attorneys.

127,509

UNITED STATES PATENT OFFICE.

RASSELAS G. PETERSON AND JONATHAN COULTER, OF PERRYVILLE, OHIO.

IMPROVEMENT IN NUT-LOCKS.

Specification forming part of Letters Patent No. 127,509, dated June 4, 1872.

Specification describing a new and Improved Nut-Lock, invented by RASSELAS G. PETERSON and JONATHAN COULTER, of Perryville, in the county of Ashland and State of Ohio.

Figure 1:
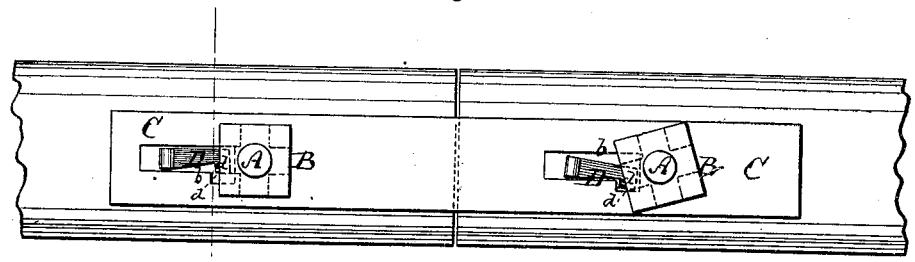
Figure 2:
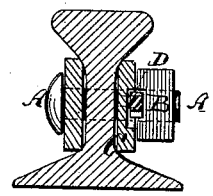
Figure 4:
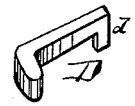
Figure 3:
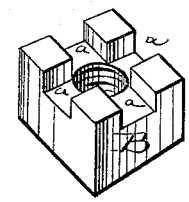

Figure 1 represents a side view of a fish-plate having our improved nut-lock. Fig. 2 is a transverse section of the same. Fig. 3 is a perspective view of the nut, and Fig. 4 a perspective view of the locking-hook.

Similar letters of reference indicate corresponding parts.

This invention relates to a new nut-lock for use on railroad rails and other purposes, and consists in the use of a hook in connection with a grooved nut and recessed fish-plate, as hereinafter more fully described.

A, in the drawing, represents the bolt to which the nut B, to be locked, is to be applied. C is the fish-plate or plate against which the nut is screwed. The nut on its inner face has a number of grooves, $a\ a$, cut into it as indicated in Fig. 3. The plate C is also grooved or recessed close to the aperture which admits the bolt, the recess $d$ being L-shaped, as shown in Fig. 1. D is a metallic hook for locking the nut. When the nut has been screwed on to the bolt as far as necessary, and until one of its grooves, $a$, is in line with the longer part of the recess $d$, the hook D is inserted in the recess and pushed under the nut into the groove $a$, the thickness of the hook being such that it extends into the nut when in the recess $b$. (See Fig. 2.) The nut is then slightly unscrewed, carrying the projecting bill or ear $d$ of the hook in the recess $b$ and changing thereby the position of parts from that shown on the left to that shown on the right of Fig. 1. The hook in this portion properly locks the nut, as during a jar or motion of any kind the tendency of the nut of becoming unscrewed will only the more firmly apply the hook to its place and insure the lock.

Having thus described our invention, we claim as new, and desire to secure by Letters Patent—

The grooved nut B, and recessed plate C, arranged in conjunction with the hook D, to constitute a nut-lock, as specified.

RASSELAS G. PETERSON.
JONATHAN COULTER.

Witnesses:
JOHN TAYLOR,
D. D. STOUFFER.